Jan. 31, 1956

V. E. RAGOSINE ET AL 2,733,356

RADIATION MEASURING INSTRUMENT

Filed April 6, 1953

INVENTORS
VICTOR E. RAGOSINE
WILLARD C. HADLEY

BY

*Spencer E. Olson*

ATTORNEY

INVENTORS
VICTOR E. RAGOSINE
WILLARD C. HADLEY

BY Spencer E. Olson

ATTORNEY

Jan. 31, 1956  V. E. RAGOSINE ET AL  2,733,356
RADIATION MEASURING INSTRUMENT
Filed April 6, 1953
3 Sheets-Sheet 3

INVENTORS
VICTOR E. RAGOSINE
WILLARD C. HADLEY
BY
ATTORNEY

United States Patent Office 2,733,356
Patented Jan. 31, 1956

2,733,356

RADIATION MEASURING INSTRUMENT

Victor E. Ragosine, Boston, and Willard C. Hadley, Newburyport, Mass., assignors to Tracerlab, Inc., Boston, Mass., a corporation of Massachusetts Application April 6, 1953, Serial No. 347,092

7 Claims. (Cl. 250—83.6)

This invention relates to an improved radiation measuring instrument or radiation meter of the type used for measuring beta and gamma radiation, for example, the meter being of the general type wherein the amount of radiation present is measured in accordance with the amount of ionization produced thereby in an ionization chamber.

This invention is concerned especially with providing a portable radiation intensity meter of convenient, compact, and readily usable form that is of a design and construction adapting it for convenient use in probing wherever it is necessary to test for radiation and obtain a measure of its intensity.

Radiation meters for this general purpose heretofore available may be classified as being of two general types; namely, those comprising an ionization chamber and an electrometer circuit for amplifying the minute ionization currents produced by the chamber prior to indication by a microammeter, and those including an ionization chamber and an electroscope in which the electroscope is charged to a predetermined voltage and the degree of discharge of the electroscope caused by ionization in the chamber is observed through a microscope.

In view of the extremely small currents involved, instruments of the former type have established an unfavorable reputation with field users, primarily due to their instability, failure to hold calibration, spurious response, the need for frequent parts replacement, and their general fragility. These disabilities are usually attributable to the electrometer portion of the instrument where aging or failure of the many circuit components limits the useful life of the instrument.

Instruments of the latter type have been used primarily for measuring the intergrated radiation dosage to which the user has been exposed during a selected period of time, and accordingly, are not particularly suitable for measuring instantaneous dosage rates, i. e. roentgens per hour. One prior art instrument of this type which applicants are familiar has incorporated therein a relaxation timer circuit to permit the determination of the discharge of the electroscope during a short predetermined time interval, whereby the dosage rate may be determined. The instrument is not continuous reading, however, and must be charged periodically to be operative. Moreover, instruments of this type include a rather expensive telescope for observing the deflection of the electroscope, an important consideration when it is remembered that instruments of this type are intended for individual distribution to large numbers of personnel. Also, the instrument is somewhat difficult and inconvenient to read.

It is the primary object of the present invention to provide a portable gamma ray meter which does not have the inherent instabilities and limitations of the prior art ionization chamber-electrometer type of meter.

A further object of the invention is to provide a rugged, portable, direct reading gamma ray intensity meter.

It is still another object of the invention to provide a direct reading radiation dosage rate meter having a minimum number of components which are inherently stable and long-lived.

With these and other objects which will become apparent as the description proceeds in view, the invention is featured by the provision, in combination, of an ionization chamber whose output current varies as a function of incident radiation, a large resistor and a source of potential connected in series with the chamber, and a quartz fiber electroscope connected across the resistor and battery for measuring the change in voltage drop across the resistor. To permit convenient observance of the deflection of the electroscope an image of the quartz fiber is optically projected onto a scale calibrated in terms of dosage rate.

Still other objects, advantages and features of the invention will become apparent from the following detailed description thereof, taken in connection with the accompanying drawings, in which like numerals refer to like parts in the several views, and in which.

Figure 1:
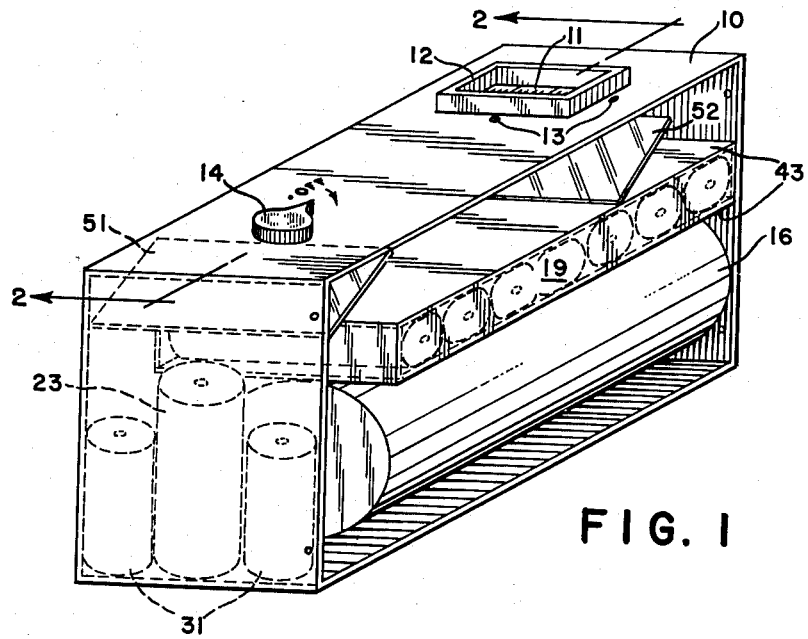
Fig. 1 is a perspective view showing a preferred form of the entire instrument.
Figure 2:
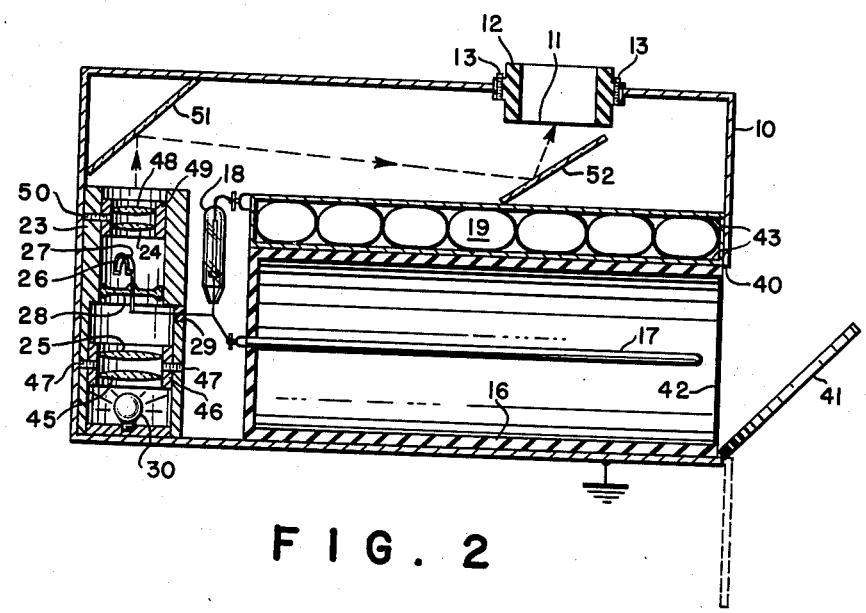
Fig. 2 is a detail view taken along line 2—2 of Fig. 1, illustrating the optical system of the instrument.

Referring now to Figs. 1 and 2 of the drawings, a preferred form of the instrument is shown comprising a housing or casing 10 in which the component parts of the instrument are contained. The cabinet is rectilinear in configuration as shown, and may be carried in the hand or supported on a suitable shoulder strap. Mounted on the upper surface of casing 10 is a calibrated translucent scale 11 on which is read radiation intensity in a manner to be described later. Scale 11 is recessed slightly within casing 10 as shown, and is supported on a rectangular member 12 secured to casing 10 by screws 13. Member 12 may be formed of metal or plastic and is provided to shield scale 11 from ambient light, the reasons for which will appear hereinbelow. Control of the instrument is afforded by a single external control knob 14 internally connected to turn the instrument off and on and to adjust the zero setting of the instrument.

Figure 3:
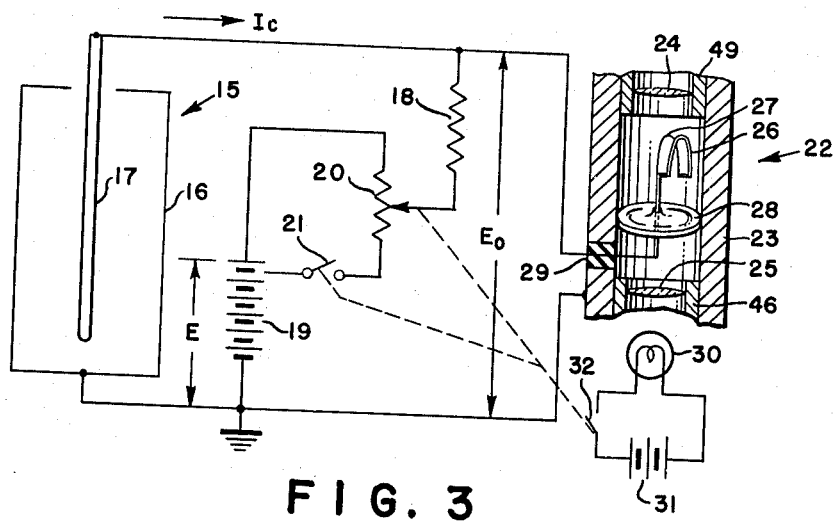
Fig. 3 is a circuit diagram of the instrument.

Before proceeding with a description of the arrangement of the components within casing 10, reference is made to Fig. 3 for a description of the electrical features of the instrument. The circuit includes ionization chamber 15 comprising a cylindrical outer conductor 16 and a central longitudinal electrode 17, a large resistor 18 having a resistance of the order of $10^{11}$ ohms and source of potential 19 connected in series as shown. Potentiometer 20 is connected across a portion of potential source 19 to permit regulation of the voltage across the chamber in the absence of radiation, thus providing a zero adjustment of the instrument. Resistor 18 is preferably vaccum sealed in glass which has been surface treated with silicone polymers to resist adverse moisture conditions. The presence of the glass seal, together with extreme care in manufacture, results in a resistor that is stable, accurate, and resistant to humidity. The constancy of this type of resistor adds to the simplicity and permanency of calibration of the circuit. With switch 21 closed, and chamber 15 exposed to radiation, a minute ionization current $I_c$ of a magnitude proportional to the intensity of incident radiation flows through resistor 18, producing a voltage drop thereacross. For a particular setting of potentiometer 20, the voltage E of source 19 is substantially constant, and accordingly, the voltage $E_0$ across the series combination of resistor 18 and battery 19 varies with the magnitude of $I_c$ as follows: $E_0 = E - I_c R_{18}$. Thus, $E_0$ is continuously proportional to the ionization current, and hence proportional to the intensity of incident radiation. The voltage $E_0$ is measured with a quartz fiber electroscope 22 connected across the series combination of resistor 18 and potential source 19. The electroscope 22, shown in fragmentary cross-section in Fig. 3, includes conducting cylinder 23, which together with suitable light transparent lenses 24 and 25 defines a chamber in which is mounted a voltage sensitive element comprising a supporting wire 26 having a portion thereof bent to form a plane, and a quartz fiber 27 having a portion corresponding in shape to the bent portion of wire 26, and secured at its ends to the supporting wire 26 and fiber 27 defining spaced, parallel planes. Wire 26 is mounted in an insulator 28 of glass or polystyrene cemented to the inner walls of chamber 23. Insulator 28 is transparent to permit the passage of light therethrough, and has a very high leakage resistance relative to the resistance of resistor 18. Supporting wire 26 is connected to the central electrode 17 of ionization chamber 15, being insulated from chamber 23 by insulator 29. Fiber 27 deflects relative to wire 26 by electrostatic action in response to a potential difference applied between it and casing 23, which is grounded, the change in deflection being proportional to the change in applied potential over a considerable range. Alternatively, cylinder 23 may be insulated from the casing and the high voltage end of resistor 18 connected thereto, and supporting wire 26 connected to ground. The former connection is preferred for ease of manufacture, but since the deflection of the quartz fiber 27 is dependent only on the difference in potential between the supporting wire and the surrounding casing, the latter connection is feasible should design considerations require it.

It will be noted that whether switch 21 is opened or closed, full battery voltage is applied to the electroscope in the absence of radiation. The leakage resistances across all insulators in the circuit are sufficiently high that leakage is essentially eliminated even though voltage is applied to the chamber 15 and electroscope 22 while the instrument is not in use. This continuous application of voltage to the electroscope serves two very useful purposes. First, with full battery voltage on the electroscope, fiber 27 is deflected to its maximum position whereby in the absence of radiation, the instrument at all times indicates zero. Secondly, the fiber 27 is maintained rigidly in position by the electrostatic field thereby preventing damage of the fiber and wrapping thereof around wire 26, which frequently occurs in the handling or accidental dropping of instruments incorporating quartz fibers.

Reviewing the operation of the circuit thus far described, with switch 21 open, full battery voltage is applied to electroscope 22 which is deflected by electrostatic action to a maximum or zero position. With switch 21 closed, potentiometer 20 is connected in shunt with a portion of potential source 19 to permit a small adjustment of the voltage applied to the electroscope which may be necessary, due to a decrease in the voltage of source 19 with extended life, to adjust the deflection of fiber 26 to a predetermined zero position. When chamber 15 is exposed to radiation, ionization current flows in resistor 18 resulting in a decrease in the potential applied to electroscope 22 and a consequent diminution of the deflection of fiber 26, the variation in deflection being proportional to the ionization current. The shadow of quartz fiber 27 is projected onto translucent glass scale 11 (Fig. 1), light for the projection of the shadow being provided by lamp 30 energized from a separate battery 31. Switch 32 in the lamp circuit is ganged with switch 21 whereby the light is turned on simultaneously with the turning on of the instrument. A further description of the projection system will appear hereinbelow.

Returning now to Figs. 1 and 2, ionization chamber 15 may comprise a cylinder 16 made of Bakelite, having a conducting coating on its inner surface, and a central longitudinal electrode 17. Casing 10 has an opening 40 therein corresponding in area to the circular area of the chamber, this opening being closed by a hinged cover 41. Chamber 15 is closed at the right end by a thin nylon covering or window 42, which permits the passage of beta radiation when cover 41 is opened, and when it is desired to measure gamma radiation in the presence of beta radiation, cover 41 may be closed. The inner conducting surface of cylinder 16 is grounded to casing 10, and central electrode 17 is connected through resistor 18 to the high voltage terminal of potential source 19, and to supporting member 26 and fiber 27 of the electroscope. Battery 19, in the present embodiment, consists of a plurality of small dry cells of the hearing aid type rigidly positioned in a rectilinear casing 43 placed directly over chamber 15 and extending longitudinally on casing 10 for a major portion of its length.

Referring in particular to Fig. 2, the electroscope and lamp 30 together with a suitable optical system for projecting a shadow of fiber 27 are assembled within conducting cylinder 23 having an internal bore as shown. Following lamp 30 are two condenser lenses 45 and 25 for illuminating the field in the plane of fiber 27. Lenses 45 and 25 are mounted in cylindrical sleeve 46 which is slidable within chamber 23 to permit prefocusing of the fiber during assembly, sleeve 46 being maintained in the properly adjusted position by set screws 47. Following the electroscope, which has previously been described in detail, is an objective including lenses 24 and 48 mounted in cylindrical sleeve 49, which in turn is slidable within chamber 23 to permit adjustment for proper focus. Sleeve 49 is maintained in its adjusted position by setscrew 50. The image of fiber 27 is twice reflected by mirrors 51 and 52 onto translucent glass scale 11 which is calibrated in roentgens/hr., or milliroentgens/hr., depending upon the range of activity for which the instrument is designed. As the deflection of fiber 27 varies in response to changes in ionization current through resistor 18, which, of course, is a function of incident radiation, the image of the fiber traverses scale 11 providing an indicator for the scale. Casing 10 preferably is light-tight to reduce the required brightness of lamp 20, and light shield 12, having a blackened inner surface for excluding a portion of the ambient light, permits ease of reading of the scale, even in bright sunlight.

It should be pointed out at this juncture that the volume of the chamber enclosing electroscope 26, 27 is very small compared to the volume of ionization chamber 15, since the electroscope chamber also defines a volume which is sensitive to radiation, the ionization therein contributing slightly to the discharge of the electroscope. Inasmuch as proper operation of the present circuit depends on the electroscope measuring only the magnitude of the ionization current produced by ionization chamber 15, it is necessary to minimize the effect of the electroscope chamber. It has been found that by reducing the volume surrounding the sensitive elements of the electroscope to about 1 cc. while using an ionization chamber having a volume of about 400 cc., the presence of the electroscope chamber has an immaterial effect on the accuracy of the instrument.

It will be noted in the foregoing description of the instrument, that the nature of the calibration of the scale has not been described. This has purposefully been done since the response of the instrument may be determined in a number of ways to insure the best indication for the range of radiation intensities to be measured. For example, if the range of intensities is reasonably small, the indication may be presented on a linear scale, whereas if the range of intensities extends over several decades, the reading accuracy of a linear scale would be poor and a non-linear indication would be preferable. For linear indication, i. e., with scale 11 calibrated in accordance with a linear function, the components of the circuit are chosen to yield a linear response. This is accomplished by a combination of voltage source 19 and ionization chamber 15 such that the chamber yields saturated current; i, e,, the magnitude of the ionization current depends entirely on the intensity of ionizing radiation, such response being virtually linear. Accordingly, the voltage drop across resistor 18 varies as a linear function of incident radiation. Now, if the electroscope is designed to produce a deflection of the quartz fiber 27 which varies linearly with the potential applied thereto, the deflection is linearly proportional to the incident radiation, and the image of the fiber traverses scale 11 in a linear fashion.

A non-linear response, necessitated by a wide range of radiation intensities, may be accomplished in two ways by modifications of the components of the circuit of Fig. 3. First, employing a combination of ionization chamber 15 and voltage source 19 which yields an ionization current linearly proportional to incident radiation, a non-linear response may be achieved by designing the electroscope to yield a deflection of fiber 27 which varies as a quasi-logarithmic function of the potential applied thereto. Such an electroscope has the same appearance as the described electroscope, but by proper selection of the fiber and the spacing thereof from wire 26, the deflection may be made non-linear with applied voltage, and accordingly, the image of the fiber traverses scale 11 in accordance with the same non-linear function.

A second combination of components for yielding a non-linear response comprises an electroscope in which the deflection of the fiber is linear with applied voltage, and an ionization chamber and potential source combination which provides an ionization current which varies as a non-linear function of incident radiation. With a properly designed ionization chamber operated at a voltage well below saturation, it is possible to provide non-linear ionization currents predicatable over a wide range of radiation intensities. A suitable chamber and circuit for this purpose are disclosed in U. S. Patent No. 2,531,804, issued November 28, 1950.

Figure 4:
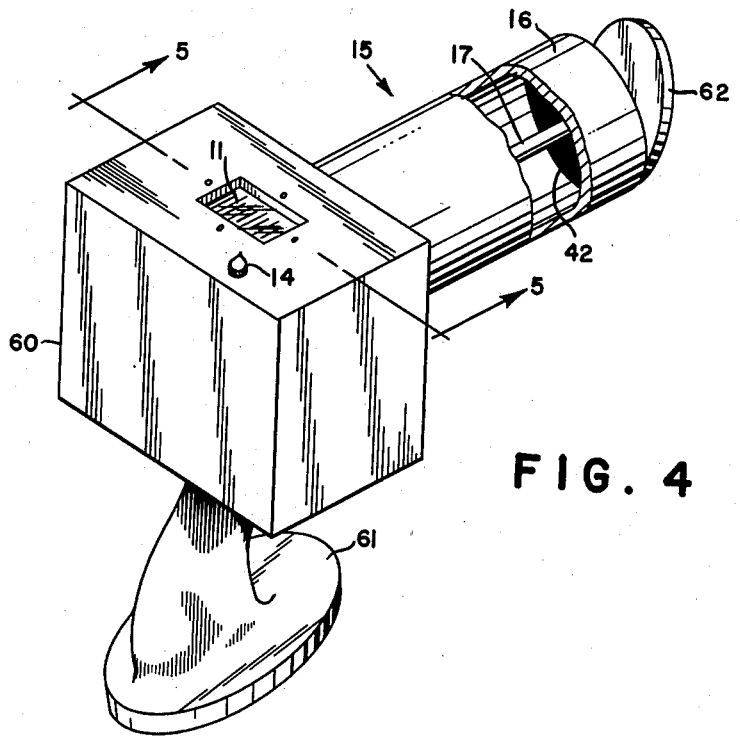
Fig. 4 is a perspective view of another form of the instrument.
Figure 5:
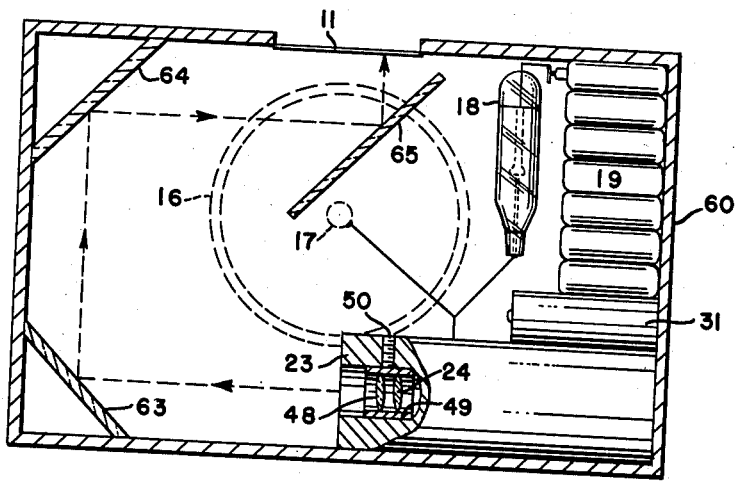
Fig. 5 is a detail view taken along line 5—5 of Fig. 4 illustrating the arrangement of the components within the instrument.

Figs. 4 and 5 illustrate another embodiment of the invention in which the circuit components are identical with those described in connection in Figs. 1, 2 and 3, but in which the organization of the ionization chamber 15 and the optical system has been changed to provide an instrument which is particularly adaptable for handling with one hand in a probing fashion. The instrument comprises a rectilinear cabinet 60 in which the batteries and the optical system are contained, provided on the underside with a handle 61, preferably in the form of a pistol grip. Mounted centrally of the upper surface of container 60 is a calibrated translucent scale 11, on which the image of the fiber 27 of the electroscope is projected to provide an indication of radiation intensity. Ionization chamber 15, having the construction described above, is mounted exteriorly of container 60 as shown. To permit the measurement of gamma radiation in the presence of beta radiation, nylon window 42 may be covered by a hinged door 62, made of Bakelite.

The electroscope sub-assembly is identical with that described in connection with Fig. 1, except that it is positioned on its side adjacent the wall of container 60 opposite scale 11, and the image of fiber 27 is reflected three times by mirrors 63, 64 and 65 onto scale 11. The dry cells comprising voltage source 19 are rigidly positioned above cylinder 23 out of the way of the projection path of the fiber image. The instrument is provided with a single control switch 14, and the operation is exactly the same as the instrument of Figs. 1 and 3.

Figure 6:
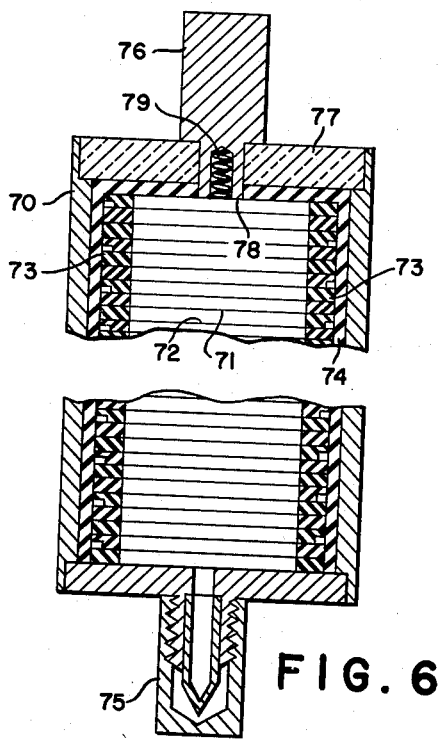
Fig. 6 is a fragmentary cross-section view of a nuclear battery which is particularly adaptable as the potential source in the circuit of Fig. 3.

While the invention has been described as employing dry batteries as the source of potential, a considerable reduction in the size of the packaged instrument and a great improvement in the shelf- and useful life of the instrument may be realized by utilizing a nuclear battery in the circuit of Fig. 3, a recently available battery of this type being shown in fragmentary cross-section in Fig. 6. The battery comprises a cylindrical metallic casing 70 in which are stacked a plurality of cells each comprising two spaced circular plates 71 and 72 of dissimilar metals separated by an annular insulating spacer 73. The volume between plates 71 and 72 is filled with an ionizable gas, such as argon, and tritium gas mixed with the argon continuously ionizes the argon. When the two dissimilar plates, which may consist of platinum and aluminum, are connected together through an external circuit, a small continuous current flows in the external circuit, the magnitude of the current, and the open circuit voltage of the cell depending on the spacing of the plates, the gas pressure and the amount of tritium used. Each cell of a successfully tested battery was about .05 inch thick and .75 inch in diameter and delivered a few millimicroamperes at a voltage of about 1.5 volts. The stacked cells are separated from casing 70 by a suitable insulating sleeve 74, such as Teflon. The casing 70 forms one terminal of the battery, cap 75 being provided as a convenient connection, and the other connection comprises conducting rod 76 projecting through insulator 77, preferably formed of vitreous material, and making contact with the upper plate 78 of the last cell by means of a light compression spring 79. The type of ionization chamber and the sensitivity of the electroscope used in the circuit of Fig. 3 determines, to a large measure, the magnitude of potential source 19, but the maximum of 200 volts deemed necessary for the circuit can be supplied by 130 cells, a stack about six inches high. The internal resistance of a battery of this size is of the order of $10^{10}$ ohms, and for the present application where currents are of the order $10^{-9}$ to $10^{-11}$ ampere, the battery has ample output. The life of the battery is dependent on the half-life of the ionizing source, which in the case of tritium is about 12½ years. Thus, the current producing capacity of the battery decreases by a factor of two each 12½ years.

It will immediately be apparent, that the use of a nuclear battery in the circuit of Fig. 3 provides a very stable source of voltage for much longer periods than are obtainable from dry cells, thus eliminating the need for ever replacing batteries. If the battery is designed to deliver twice the necessary current when the battery is new, the battery may be used for 25 years without replacement, more than adequate for an instrument of this type. In addition, the space requirements are much less than that for conventional batteries making possible a more compact and more readily portable instrument.

It will also be understood that while the ionization chamber has been described as being cylindrical in shape with a longitudinal center electrode, other designs may be used to achieve greater sensitivity or a reduction in volume without departing from the spirit of the invention. For example, the chamber may be rectangular in form, may have flat plate electrodes, or may be filled with different gases under various conditions of pressure. Therefore the cylindrical chamber should be considered as illustrative, and not in a limiting sense.

It is apparent from the foregoing disclosure that there is provided a radiation intensity meter for indicating dosage rate that is rugged, is of small size and weight, has a long useful life without appreciable maintenance, is simple to operate and extremely convenient to read, and is economical to manufacture in large quantities.

What is claimed is:

1. A radiation dosage rate meter comprising an ionization chamber, a resistor and a source of potential connected in series, an electroscope having a chamber of a volume very small compared to the said ionization chamber and a quartz fiber, means connecting the junction of said ionization chamber and said resistor to said quartz fiber and means connecting the junction of said ionization chamber and said potential source to said electroscope chamber, whereby a potential is continuously applied to said electroscope and the deflection of said fiber is a measure of the ionization current through said resistor.

2. In a portable radiation dosage rate meter, an ionization chamber, a high resistance, low leakage resistor and a source of potential connected in series for producing a current flow through said resistor proportional to incident radiation, an electroscope including a quartz fiber mounted in a conducting chamber of a volume very small relative to said ionization chamber, the deflection of said quartz fiber being proportional to the potential applied between said fiber and said conducting chamber, means connecting said electroscope across the series combination of said resistor and said potential source whereby a potential is continuously applied to said electroscope and the deflection of said fiber is proportional to the intensity of radiation incident on said ionization chamber.

3. A radiation dosage rate meter comprising an ionization chamber, a high resistance, low leakage resistor, a nuclear battery formed of a plurality of stacked cells each consisting of a pair of plates of dissimilar metal separated by an ionizable gas continuously subjected to substantially constant intensity ionizing radiation, means connecting said battery and said resistor in series with said ionization chamber for producing a current through said resistor proportional to the intensity of radiation incident upon said ionization chamber, and a quartz fiber electroscope connected across said resistor and said battery whereby potential is continuously applied to said electroscope and the deflection of said electroscope is continuously proportional to the magnitude of the current through said resistor.

4. A portable direct reading radiation dosage rate meter comprising in combination, a casing having calibrated translucent scale fitted in an opening in the upper surface thereof, an optical system including a conducting cylinder in which are arranged a lamp, condensing lens and an objective in the order named, an electroscope comprising a conducting supporting wire having a portion thereof bent to form a plane and quartz fiber having a portion thereof conforming in shape to the bent portion of said supporting wire and defining a second plane spaced from the plane of said wire, said electroscope being disposed within said conducting cylinder intermediate said condensing and objective lenses, an ionization chamber having a volume very large relative to the volume surrounding said electroscope, a high resistance, low leakage resistor and a source of potential connected in series with said ionization chamber for producing a current flow in said resistor proportional to incident radiation, means connecting said electroscope across said resistor and said potential source whereby potential is continuously applied to said electroscope, and the deflection of said quartz fiber relative to said supporting wire is proportional to the current flow through said resistor, and means including said optical system and a plurality of reflecting mirrors for projecting the image of said quartz fiber onto said calibrated scale to provide an indicator for said scale movable thereacross in accordance with a predetermined function of the intensity of incident radiation.

5. A portable direct reading radiation dosage rate meter comprising, in combination, a casing having a graduated scale fitted in an opening in the upper surface thereof, an ionization chamber, a high resistance, low leakage resistor and a source of potential connected in series, said potential source comprising a nuclear battery formed of a plurality of stacked cells each consisting of a pair of plates of dissimilar metal separated by an ionizable gas continuously subjected to substantially constant intensity ionizing radiation, an electroscope comprising a supporting wire having a portion thereof bent to form a plane and a quartz fiber having a portion thereof conforming in shape to the bent portion of said supporting wire and defining a second plane spaced from the plane of said wire, said wire and quartz fiber being mounted in a conducting chamber having a volume small compared to said ionization chamber, means connecting said electroscope across the series combination of said resistor and said potential source whereby potential is continuously applied to said electroscope and the deflection of said quartz fiber relative to said supporting wire is continuously proportional to the current flowing through said resistor in response to radiation impinging on said ionization chamber, and an optical system including a light source mounted within said casing for projecting an image of said quartz fiber onto said graduated scale to provide an indicator for said scale movable thereacross in accordance with a predetermined function of the intensity of incident radiation.

6. Apparatus in accordance with claim 5 wherein said ionization chamber and said potential source provide an ionization current which varies as a non-linear function of incident radiation, the deflection of said electroscope is linearly proportional to the potential applied thereto, and said scale is calibrated in accordance with said non-linear function.

7. Apparatus in accordance with claim 5 wherein said ionization chamber and said potential source provide an ionization current which varies as a linear function of incident radiation, the deflection of said electroscope is a non-linear function of the potential applied thereto, and said scale is calibrated in accordance with said non-linear function.

References Cited in the file of this patent

UNITED STATES PATENTS

| | | |
|---|---|---|
| 1,855,669 | Glasser et al. | Apr. 26, 1932 |
| 2,601,583 | Ballou | June 24, 1952 |
| 2,610,302 | Christian | Sept. 9, 1952 |
| 2,623,184 | Montgomery et al. | Dec. 23, 1952 |
| 2,696,564 | Ohmart | Dec. 7, 1954 |

OTHER REFERENCES

"A New Electronic Battery" from "The Electrician," October 31, 1924, p. 497.